March 1, 1955     J. H. HAMMOND, JR     2,703,078
COOKING STOVE WITH RENEWABLE COOKING SURFACE
Filed Feb. 2, 1953     2 Sheets-Sheet 1

INVENTOR.
JOHN HAYS HAMMOND, JR
BY
atty

March 1, 1955 J. H. HAMMOND, JR 2,703,078
COOKING STOVE WITH RENEWABLE COOKING SURFACE
Filed Feb. 2, 1953 2 Sheets-Sheet 2

INVENTOR.
JOHN HAYS HAMMOND, JR.
BY

United States Patent Office 2,703,078
Patented Mar. 1, 1955

2,703,078
COOKING STOVE WITH RENEWABLE COOKING SURFACE

John Hays Hammond, Jr., Gloucester, Mass.

Application February 2, 1953, Serial No. 334,593

3 Claims. (Cl. 126—214)

This invention relates to cooking stoves and has for an object to provide a stove having a renewable cooking surface.

In accordance with one embodiment of this invention a roll of metallic foil is mounted at the rear of the stove in a position to be pulled across the cooking area of the stove to provide a renewable cooking surface. The foil may be indented to form a grease receptacle. After use, the foil may be severed from the roll and discarded, and a new sheet of foil pulled into place.

The invention also consists in certain new and original features of construction and combinations of parts hereinafter set forth and claimed.

Figure 1:
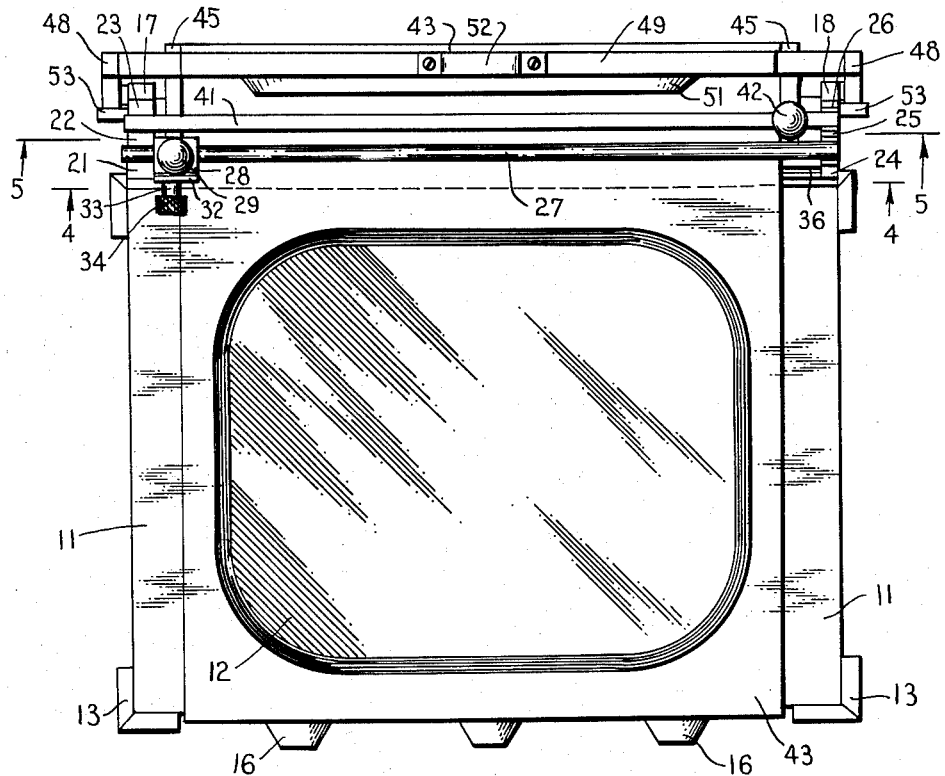
Figure 4:
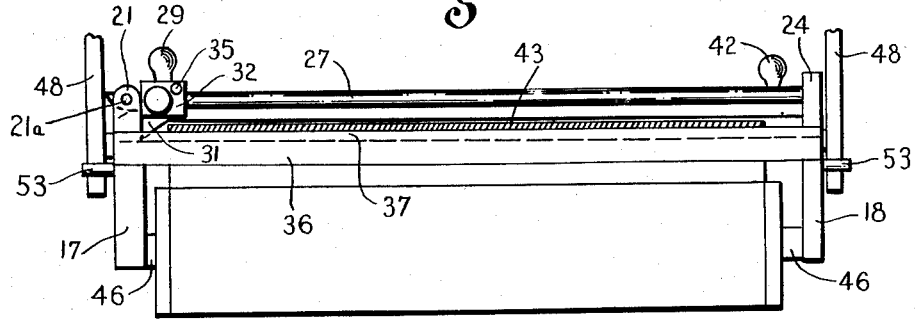
Figure 5:
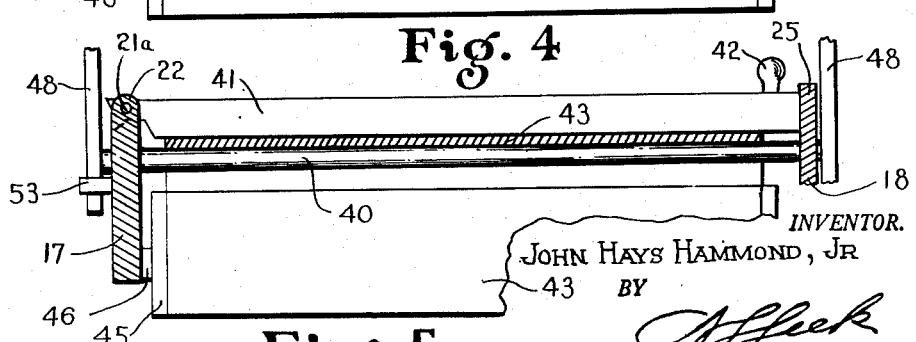
Figure 2:
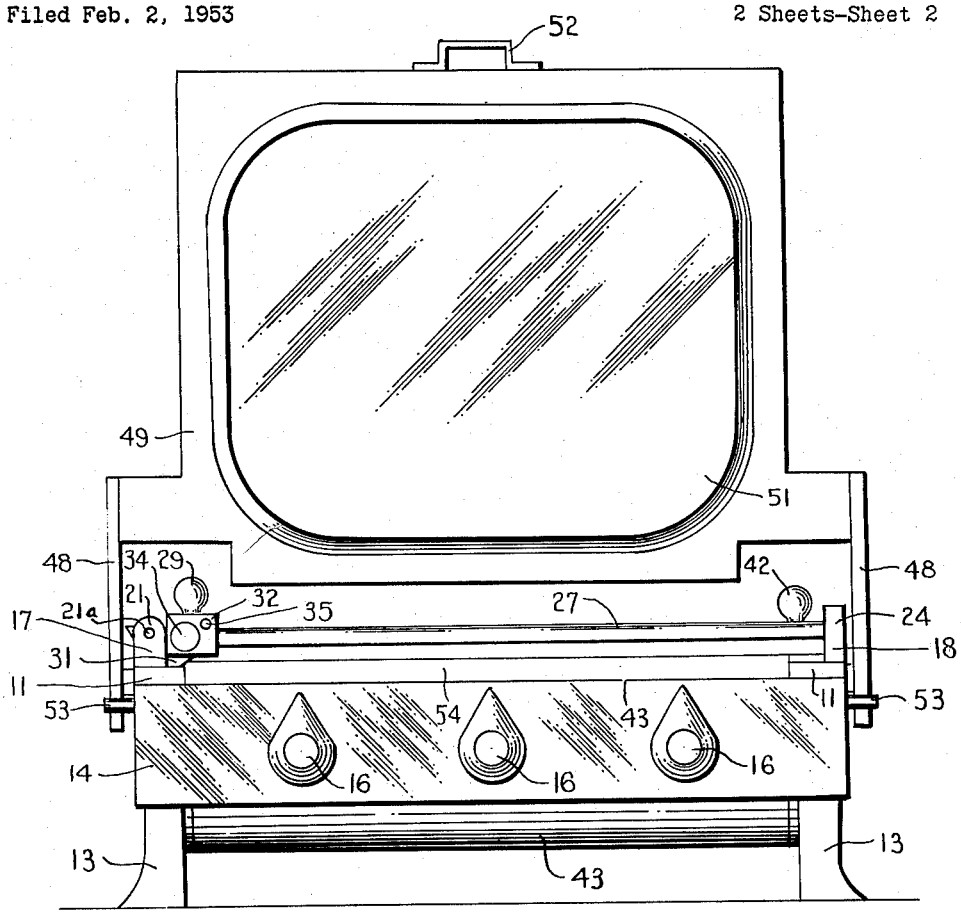
Figure 3:
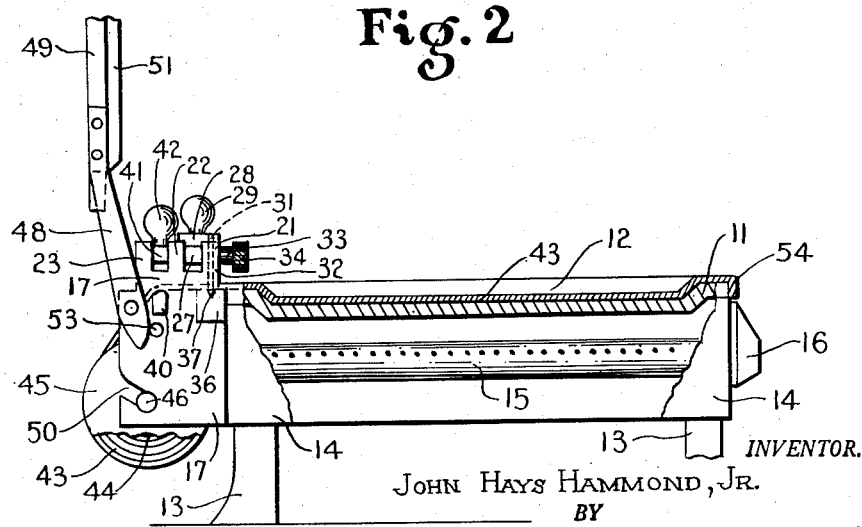

The nature of the invention as to its objects and advantages, the mode of its operation and the manner of its organization, may be better understood by referring to the following description, taken in connection with the accompanying drawings forming a part thereof, in which:

Fig. 1 is a top plan view of a stove constructed in accordance with the invention, Fig. 2 is a front elevation thereof, Fig. 3 is a side elevation thereof, Fig. 4 is a vertical section taken on line 4—4 of Fig. 1, and Fig. 5 is a vertical section taken on line 5—5 of Fig. 1.

Like reference characters denote like parts in the several figures of the drawings.

In the following description parts will be identified by specific names for convenience, but they are intended to be generic in their application to similar parts.

Referring to the accompanying drawings, a hot plate 11 forming the cooking surface of a stove, is provided with a shallow depression 12 for retaining grease. The plate 11 is mounted on four legs 13 to which are attached a metallic skirt 14. Mounted below the plate 11 are the usual burners, shown as gas burners 15 which are individually controlled by valves 16.

Mounted on the rear of the stove are two brackets 17 and 18. The bracket 17 is provided with three ears 21, 22 and 23 and the bracket 18 is provided with three ears 24, 25, 26. Pivotally mounted between the ears 21 and 22 by a pin 21a is a rod 27 of square cross section, free end of which fits snugly between the ears 24 and 25. Slidably mounted on the rod 27 is a slider 28 provided with a knob 29 and a knife blade 31 which is removably held in place by a plate 32, secured by a screw 33 provided with a knurled head 34. A pin 35 is mounted in the slider 28 to prevent the knife 31 from turning. Mounted in the brackets 17 and 18 is a cross member 36, which is provided with a top groove 37 in which the end of the knife blade 31 rides.

Pivotally mounted between the ears 22 and 23 by pin 21a is a rectangular member 41 the free end of which fits snugly between the ears 25 and 26. A knob 42 is attached, near the free end of member 41. Fixedly mounted in the brackets 17 and 18 is a second rectangular bar 40, the upper surface of which is rounded. A sheet of foil 43, which for example may be made of aluminum, is wound on a roller 44, which is provided with end collars 45. The roller 44 is provided with bearing pins 46 which fits into slots 50 in the brackets 17 and 18, thus permitting the roller 44 to turn freely on its axis. Pivoted to the brackets 17 and 18 are two arms 48 to the upper ends of which are attached a cover plate 49, which is provided with a raised portion 51 corresponding in form to the depression 12 in the plate 11. A handle 52 is attached to the cover plate 49 and stop pins 53 are attached to the brackets 17 and 18 to limit the motion of arms 48.

Operation

When it is desired to use the stove, a roll of foil 43 is placed on the roller 44 and the latter is put in place by inserting the pins 46 into the slots 50. Both bars 27 and 41 are then lifted about their pivots into a vertical position and the foil 43 is pulled across the bar 42, the member 36 and the plate 11, the front edge of the foil being folded over the front edge of the plate 11, as shown at 54 in Fig. 3. The bars 27 and 41 are now returned to their horizontal positions and the cover plate 49 is pulled down by means of the handle 52 to cause the raised portion 51 to enter the depressed part 12 of plate 11, thus conforming the foil 43 to this depression. The cover plate 49 is now raised to its initial position.

The stove is now ready for cooking operations which are performed in their usual manner in the depressed part of the surface of the foil 43. When it is desired to have a fresh surface for cooking, the slider 28 is moved to the right by means of the knob 29 thus drawing the knife blade 31 over the foil 43 to sever the same from the foil remaining on the roller 44. The used foil is now discarded and the rod 27 is lifted to the vertical position. As this is done, the slider 28 slides back to its initial position under the action of gravity and a new area of foil, is pulled forward to cover the plate 11 and the edge is folded down over the plate 11 as before. The rod 27 is now lowered to its initial position and the cover plate 49 is pulled down so as to form a depression in the foil 43 as already described.

The stove is now again ready for cooking operations with a new foil surface which may be renewed as often as necessary. When it is necessary to put in a new roll of foil the bars 27 and 41 are raised to their vertical positions, the roller 44 is removed, the new roll of foil placed thereon, the roller replaced in position and the foil pulled into position on the plate 11 as above described.

Although only a few of the various forms in which this invention may be embodied have been shown herein, it is to be understood that the invention is not limited to any specific construction but may be embodied in various forms without departing from the spirit of the invention.

What is claimed is:

1. A cooking stove comprising a hot plate having a cooking surface, a roll of strip metal foil having a width corresponding to that of said cooking surface, a bracket on said stove mounting said roll adjacent one side of said hot plate in position to permit a sheet of said foil to be pulled from said roll and disposed over said cooking surface, a guide extending across said sheet on the side of said hot plate toward said bracket, a slide sliding on said guide, and a knife to sever said foil carried by said slide.

2. A cooking stove comprising a hot plate having a cooking surface, a roll of strip metal foil having a width corresponding to that of said cooking surface, a bracket on said stove mounting said roll adjacent one side of said hot plate in position to permit a sheet of said foil to be pulled from said roll and disposed over said cooking surface, a rod pivoted to said bracket and extending across said sheet on the side toward said roll and a knife slidably mounted on said rod to sever said sheet.

3. A cooking stove comprising a hot plate having a cooking surface, a roll of strip metal foil having a width corresponding to that of said cooking surface, a bracket on said stove mounting said roll adjacent one side of said hot plate in position to permit a sheet of said foil to be pulled from said roll and disposed over said cooking surface, a pair of members pivotally mounted on said bracket and extending across said sheet, one of said members engaging said sheet to hold the same in position, and a knife slidably mounted on the other of said members to sever said sheet from said roll.

References Cited in the file of this patent

UNITED STATES PATENTS

| Number | Name | Date |
|---|---|---|
| 1,729,292 | McCarthy | Sept. 24, 1929 |
| 2,225,176 | Lewis | Dec. 17, 1940 |
| 2,236,992 | Broadley | Apr. 1, 1941 |
| 2,452,218 | Bemis | Oct. 26, 1948 |
| 2,507,931 | Pizzonia | May 16, 1950 |
| 2,555,416 | Marano | June 5, 1951 |
| 2,636,654 | Sykes | Apr. 28, 1953 |
| 2,645,543 | Mancini | July 14, 1953 |